(12) United States Patent
McCarthy et al.

(10) Patent No.: US 8,430,074 B2
(45) Date of Patent: Apr. 30, 2013

(54) ROTATABLE VALVE IN A CYLINDER INTAKE DUCT

(75) Inventors: Thomas A. McCarthy, Dearborn, MI (US); Jianwen James Yi, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 12/966,752

(22) Filed: Dec. 13, 2010

(65) Prior Publication Data

US 2012/0145121 A1 Jun. 14, 2012

(51) Int. Cl.
*F02B 31/06* (2006.01)

(52) U.S. Cl.
USPC ...... 123/188.14; 123/301; 123/306; 123/308; 123/432

(58) Field of Classification Search ............ 123/188.14, 123/301, 306, 308, 432
See application file for complete search history.

(56) References Cited

U.S. PATENT DOCUMENTS

| | | | | |
|---|---|---|---|---|
| 5,311,848 A | * | 5/1994 | Isaka et al. | 123/188.14 |
| 5,487,365 A | * | 1/1996 | Isaka | 123/306 |
| 5,564,383 A | * | 10/1996 | Isaka et al. | 123/306 |
| 5,575,248 A | * | 11/1996 | Tada | 123/184.56 |
| 5,651,344 A | * | 7/1997 | Nishigaki et al. | 123/432 |
| 5,718,198 A | | 2/1998 | Adamisin et al. | |
| 5,787,851 A | * | 8/1998 | Sakurai et al. | 123/184.55 |
| 5,794,587 A | * | 8/1998 | Isaka | 123/308 |
| 5,819,706 A | * | 10/1998 | Tsuchida et al. | 123/432 |
| 5,954,019 A | | 9/1999 | Yoshikawa et al. | |
| 6,053,145 A | * | 4/2000 | Suzuki et al. | 123/298 |
| 6,394,066 B1 | | 5/2002 | Chou et al. | |
| 6,634,333 B2 | | 10/2003 | Fujieda et al. | |
| 6,668,791 B2 | | 12/2003 | Tetsuno et al. | |
| 6,672,277 B2 | | 1/2004 | Yasuoka et al. | |
| 6,725,828 B1 | | 4/2004 | Han et al. | |
| 6,827,054 B2 | | 12/2004 | Bucknell et al. | |
| 6,854,440 B2 | | 2/2005 | Cathcart et al. | |
| 7,128,050 B1 | * | 10/2006 | Abe | 123/306 |
| 2003/0062022 A1 | * | 4/2003 | Iriya | 123/301 |
| 2003/0075141 A1 | * | 4/2003 | Ohta et al. | 123/301 |
| 2004/0211390 A1 | * | 10/2004 | Kim et al. | 123/308 |
| 2004/0231638 A1 | * | 11/2004 | Tominaga et al. | 123/308 |
| 2004/0237931 A1 | * | 12/2004 | Okamoto et al. | 123/308 |
| 2007/0181088 A1 | | 8/2007 | Akasaka | |
| 2010/0162993 A1 | | 7/2010 | Yoshikawa et al. | |

* cited by examiner

*Primary Examiner* — Erick Solis
(74) *Attorney, Agent, or Firm* — Julia Voutvras; Alleman Hall McCoy Russell & Tuttle LLP (57) ABSTRACT

A spark ignition direct injection fuel cylinder for an engine includes a rotatable valve at a curved wall of an intake duct. The rotatable valve provides a variable step in to adjust the degree of tumble airflow while reducing flow restriction to improve engine performance across operating conditions.

20 Claims, 6 Drawing Sheets

HIGH TUMBLE RATIO
FIG. 5B

LOW TUMBLE RATIO
FIG. 5A

FIG. 6

ROTATABLE VALVE IN A CYLINDER INTAKE DUCT

FIELD

The present application relates to a method and a system for regulating a tumble airflow pattern in an engine cylinder for a vehicle, such as a spark ignition direct injection cylinder, via a rotatable valve in an air intake duct.

BACKGROUND AND SUMMARY

Vehicles with direct injection engines employ various methods for mixing fuel and air in an engine cylinder. Efficient mixing increases combustion burn rate, improving combustion stability and knock suppression. Spark ignition engines may use tumble flow motion to generate turbulence, which includes rotational motion generally perpendicular to the cylinder axis to improve air and fuel mixing. Depending on operating conditions, more or less tumble flow may be advantageous.

U.S. Pat. No. 5,718,198 provides one example approach to regulate tumble flow using a slide plate midway through each of a plurality of intake runners. The slide plate includes a plurality of holes with a size and shape complementary to those of a cross section of each intake runner. The slide plate is moved up and down to simultaneously regulate the amount/velocity of air flow through all of the intake runners by partially blocking air flow or permitting full air flow. For example, for high load and/or engine speed, the slide plate is aligned with the intake runners so that air passages are fully open and airflow is not blocked. In another example, during slow idle, the slide plate is moved into a position where the intake runners are only open partially along the top of the runners. This creates an off-center opening along the top of the air passages and causes the air flowing through the openings to begin a tumbling type of airflow pattern.

The inventors herein recognize potential issues with such a configuration for generating tumble airflow. As one example, when the slide plate is partially closed, air traveling through the intake runner may impact the abrupt wall of the slide plate as the airflow changes direction in order to pass through the opening. Such an approach may create significant flow resistance and unnecessarily reduce the velocity of air as it travels from the intake side of the slide plate to the cylinder side of the slide plate. As a second example, because of the vertical motion of the plate, the engine must accommodate space for the slide plate both above and below the intake runners. In compact engine designs, the available space in such regions is extremely limited.

Thus, some of the above issues may be at least partly addressed by an engine cylinder head coupled to a cylinder, comprising an intake duct having a wall, and a rotatable valve, wherein a cross-section of the valve has a first surface with greater curvature than a second surface. In a first position, the second surface aligns with a curve in the wall, and in a second position, the first surface and the second surface protrude into the duct and form a step at the wall. In one example, the first position allows airflow through the intake duct with a reduced obstruction, since the second surface aligns with the curved wall of the intake duct. This first position of the valve may be used during high load/speed in an engine to increase airflow efficiency, and thus increase peak torque of the engine. In the second position, the first surface and the second surface may create a downstream step in the intake duct via their protrusion into the duct, which can increase tumble flow patterns in the intake air and cylinder. Thus, the second position may be used during low engine load/speed to increase the tumble flow. Further, because the valve can rotate between these positions, as well as potentially other positions therebetween or thereafter, a compact engine cylinder head design is achieved.

In one specific example, the rotatable valve is located at a curvature of at air intake duct, which is proximate to the coupling between the intake duct and the cylinder head. Further, the rotatable valve is rotatable around a rotational axis, which lies outside of the intake duct. As such, the rotatable valve is located at a location where airflow is affected by low engine load/speed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are drawn approximately to scale.

DETAILED DESCRIPTION

The following description relates to a cylinder head including an intake duct with a rotatable valve for an engine of a vehicle, such as a spark ignition direct injection gasoline engine. Spark ignition engines may use tumble flow motion to generate turbulence in fuel cylinders, which includes rotational motion generally perpendicular to the cylinder axis, wherein the angular velocity is proportional to the engine speed. A tumble ratio is defined as the angular velocity normalized by the engine speed. Thus, tumble ratio can be used to represent the strength of the in-cylinder airflow motion. When a tumble ratio is low, the tumble airflow motion may be insufficient to provide turbulence for efficient mixing of air and fuel, resulting in engine performance degradation. In order to provide efficient mixing of air and gas in a cylinder of an engine, which is operated at both high and low load/speed, the rotatable valve in the intake duct may be rotated between a first position (at low load/speed) and a second position (at high load/speed).

The rotatable valve includes a first curved surface and a second curved surface. The first curved surface has a greater degree of curvature than the second curved surface. The second curved surface is disposed in the intake duct and aligns with a wall of the intake duct in a first position.

Figure 1:
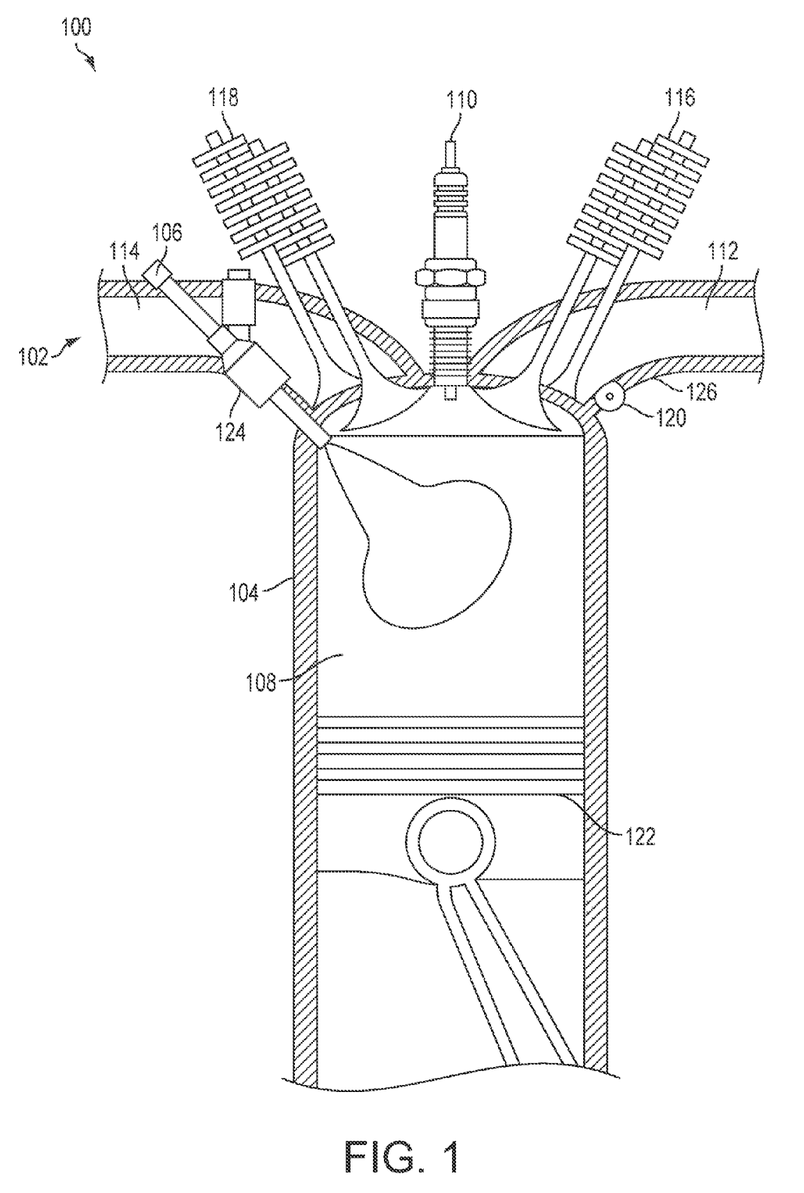
FIG. 1 includes a cross-section of an example embodiment of a spark ignition direct injection fuel cylinder.
Figure 2:
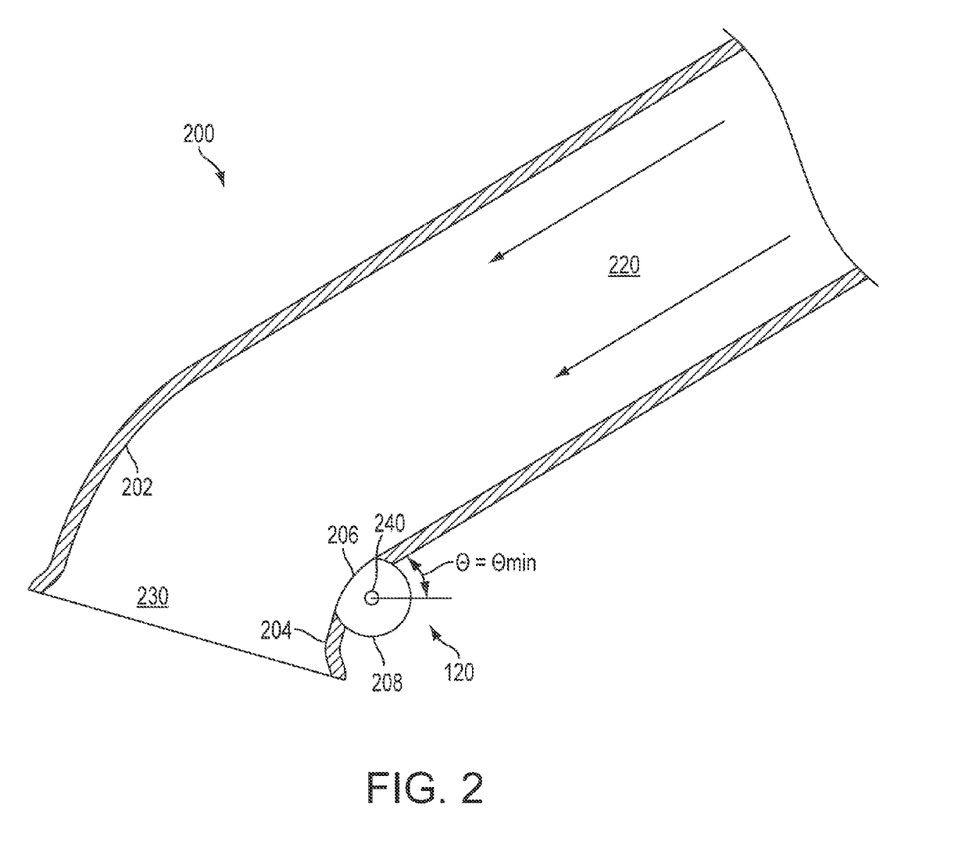
FIG. 2 shows a detailed depiction of the intake duct and the rotatable valve in the first position.
Figure 3:
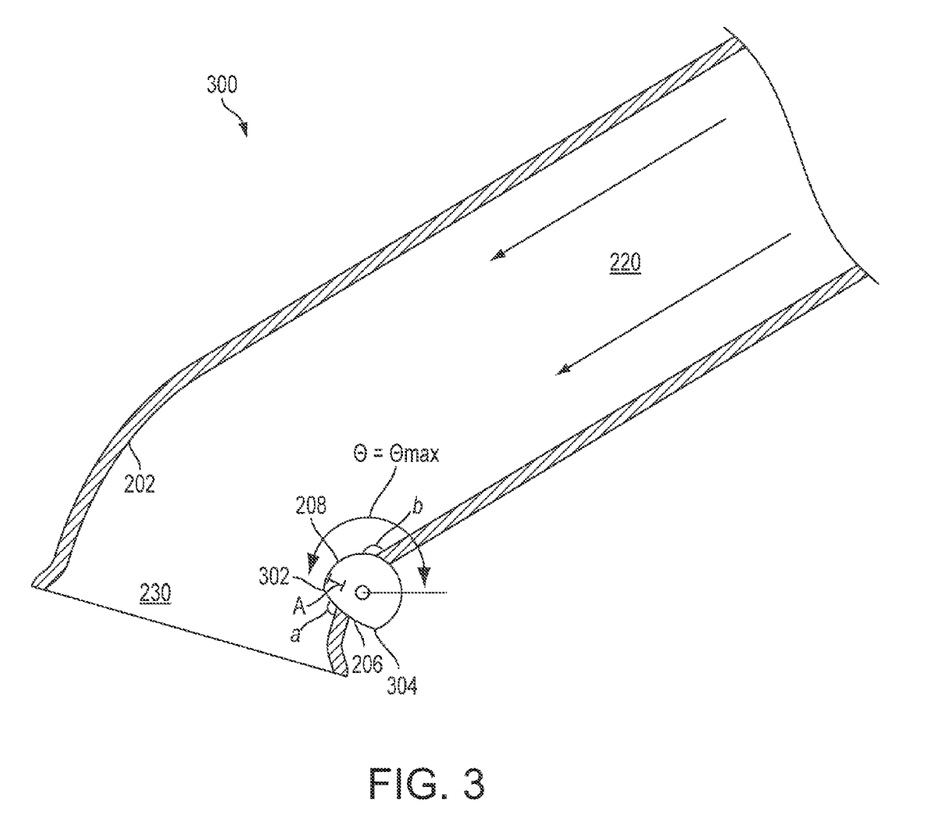
FIG. 3 shows a detailed depiction of the intake duct and the rotatable valve in the second position.
Figure 4:
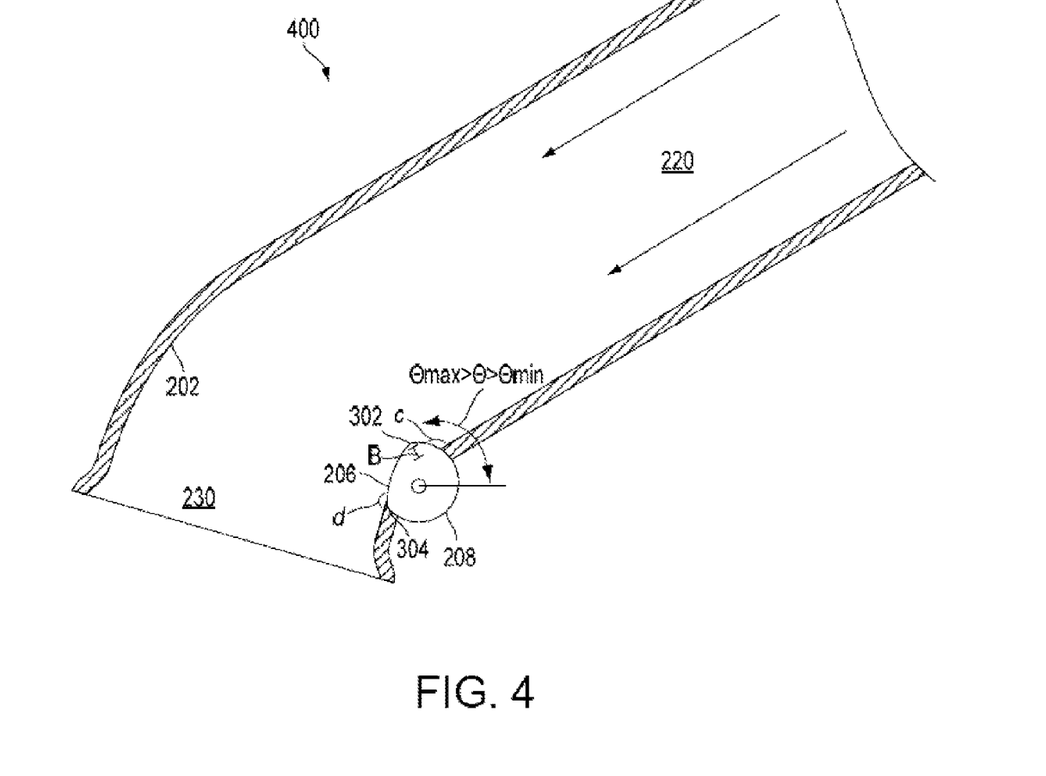
FIG. 4 shows a detailed depiction of the intake duct and the rotatable valve in a third position, intermediate between the first position and the second position.
Figure 5A:
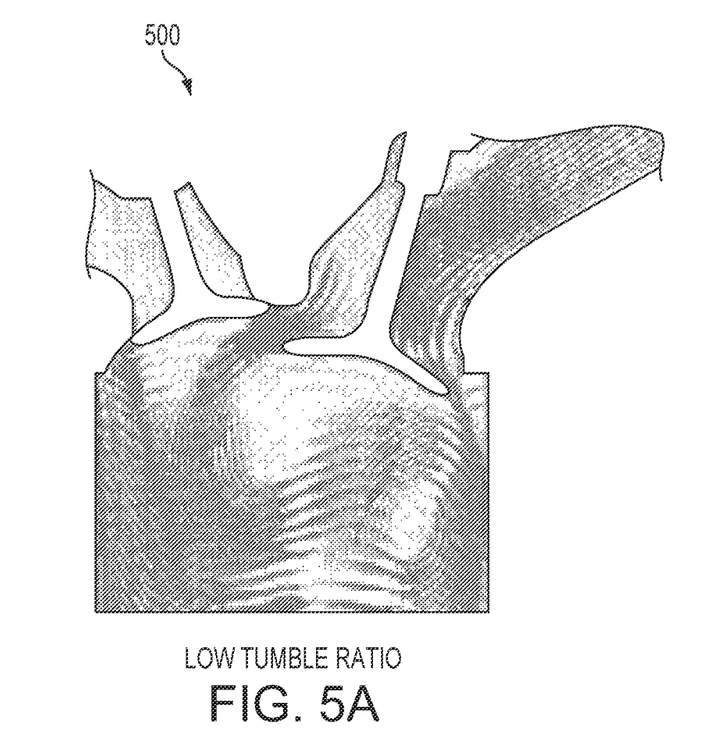
FIGS. 5A and 5B show an example airflow pattern during low tumble ratio and an example airflow pattern during high tumble ratio, respectively.
Figure 5B:
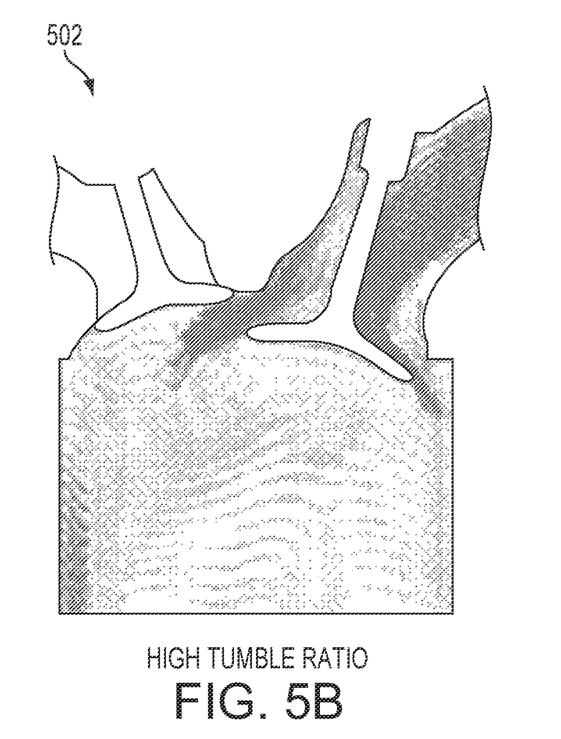
Figure 6:
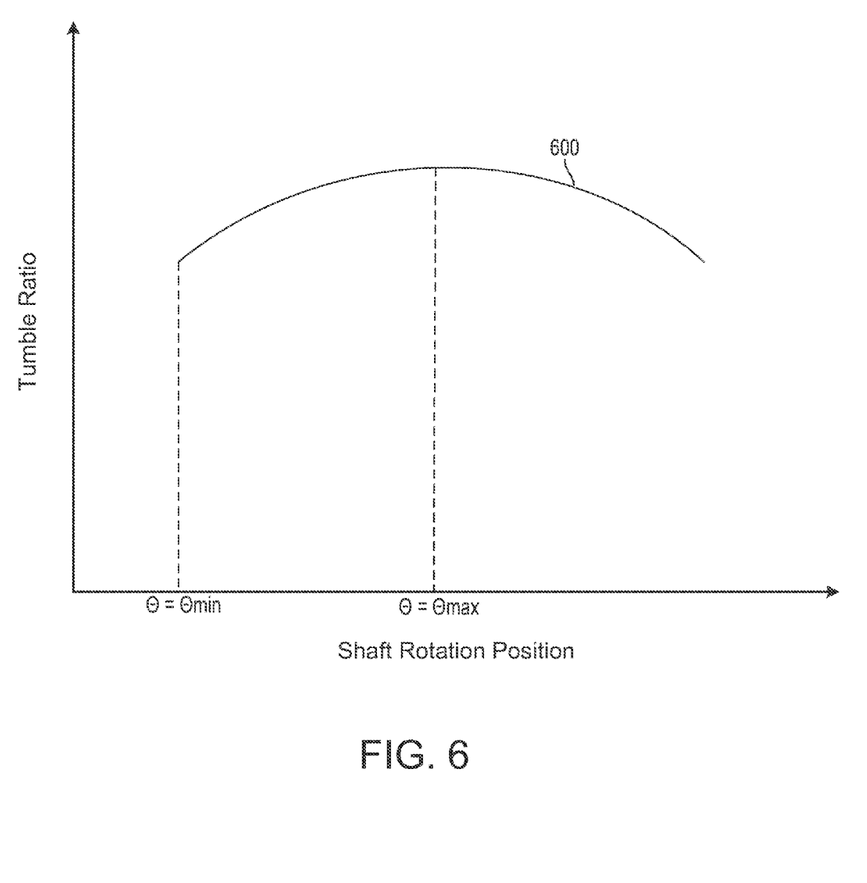
FIG. 6 is a graph depicting the relationship between the rotatable valve position and the tumble ratio.

In the first position, airflow is unobstructed, more air flows through the valve area due to relatively even distribution of the flow between the upper and lower port area. Higher air flow improves engine torque and power when the engine operates at full load conditions. In the second position, airflow is more obstructed than in the first position, and the rotatable device protrudes (further) into the air flow path. In this case, a more sudden change of flow direction results in flow separation, where the flow will follow the trajectory of the first curved surface, with flow more biased toward the upper part of the port. Once this flow reaches the cylinder, a stronger rotational flow (tumble) will be generated. This higher tumble flow promotes fuel-air mixing homogeneity. It can also contain a higher turbulence intensity and thus improve engine combustion rate. Increased mixing homogeneity and a higher rate of combustion provide improved performance at partial load operation in that they can improve engine combustion efficiency and fuel economy. FIG. 1 shows an example embodiment of a spark ignition direct injection fuel cylinder. The spark ignition direct injection fuel cylinder comprises, in part, a combustion chamber, an intake duct with a rotatable valve, a spark plug, a fuel injector, and an exhaust duct. FIG. 2 shows a detailed depiction of the intake duct of FIG. 1 including a rotatable valve in the first position. In the first position, the first curved surface is aligned with the wall of the intake duct and the tumble ratio is not increased by the rotatable valve. As depicted in FIG. 3 in a second position, the first curved surface and the second curved surface are each partially disposed in the intake duct, such that the rotatable valve substantially protrudes into the airflow pathway and increases the tumble ratio via an abrupt stepped airflow path. Further, the rotatable valve may be rotated to a plurality of intermediate positions, depending on engine load/speed. An example of an intermediate position for the rotatable valve is shown in FIG. 4. FIG. 5A shows an example airflow pattern during low tumble ratio in the example fuel cylinder of FIG. 1. FIG. 5B shows an example airflow pattern during high tumble ratio in the example fuel cylinder of FIG. 1. FIG. 6 includes a graph depicting the relationship between rotatable valve position and tumble ratio.

Turning now to FIG. 1, it shows an example spark ignition direct injection fuel cylinder 100 including a cylinder head 102 coupled to a cylinder body 104. A combustion chamber 108 is provided in the space between the cylinder head 102, the cylinder body 104, and a piston 122. The cylinder head 102 includes a fuel injector 106, which sprays fuel into the combustion chamber 108. Further, the cylinder head 102 includes a spark plug 110, which ignites fuel and air in the combustion chamber 108. Air and fuel burned in the combustion chamber 108 may provide power to drive and/or operate a vehicle. In the present embodiment, the spark plug 110 is positioned directly above the combustion chamber 108. The fuel injector 106 is coupled a side of the cylinder head 102 such that is may project fuel spray at an angle. In alternate embodiments, the spark plug and fuel injector may be mounted to the cylinder head at alternate positions. For example, both of the spark plug and the fuel injector may be positioned directly above the combustion chamber.

The cylinder head 102 also includes an intake duct 112 and an exhaust duct 114. Opening and closing of the intake duct 112 and the exhaust duct 114 are regulated by an intake valve 116 and an exhaust valve 118, respectively. The intake duct 112 directs air into the combustion chamber 108. The intake duct 112 may be coupled to an air inlet (not shown). For example, the intake duct may be coupled to an inlet, which is open to the atmosphere. The exhaust duct 114 directs exhaust out of the combustion chamber 108 and may be coupled to an exhaust treatment and may be further coupled to an exhaust outlet. In an alternate embodiment, the vehicle may exclude an exhaust treatment system.

Each of the exhaust duct 114 and the intake duct 112 include a curvature (124 and 126, respectively), proximate to a location of coupling between the ducts and the cylinder head 102. As depicted in FIGS. 1-4, the cross-section view of curvature 126 of the intake duct 112 shows that the curvature has first face 202 with a lesser degree of curvature than a second face 204. A rotatable valve 120 is located at the second face 204. The rotatable valve includes a first curved surface 206, which matches a degree of curvature of the second face 204. In FIG. 1, the rotatable valve 120 is shown in a first position wherein the first curved surface 206 is aligned with the second face 204. Opposite the first curved surface 206, the rotatable valve 120 includes a second curved surface 208. The second curved surface has a degree of curvature that is greater than the first curved surface 206. An intersection between the first curved surface 206 and the second curved surface 208 forms curved steps 302 and 304 on each side of the rotatable valve 120.

The rotatable valve 120 further includes a rotational axis 240. The rotatable valve 120 may rotate around the rotational axis 240 from a first position 200, as in the example shown in FIGS. 1 and 2, to a second position 300, as in the example shown in FIG. 3. In the first position 200 the rotatable valve 120 has a minimum degree of rotation ($\Theta=\Theta_{min}$). In the second position 300 the rotatable valve 120 has a maximum degree of rotation ($\Theta=\Theta_{max}$). The rotatable valve 120 may be rotated into an intermediate position, wherein the degree of rotation is greater than the minimum and less than the maximum ($\Theta_{max}<\Theta>\Theta_{min}$). An example of an intermediate position 400 is depicted in FIG. 4.

The example vehicle may be operated under high engine load/speed conditions or low engine load/speed conditions. Further, the engine may be operated under intermediate engine load/speed conditions. During high engine load/speed operation of the vehicle, sufficient tumble flow pattern (high tumble ratio) for efficient mixing of air and fuel in the combustion chamber may be generated by engine operation alone. An example airflow pattern having a high tumble ratio is shown in FIG. 5A. As shown in FIG. 5A, a tumble airflow pattern which provides efficient mixing of air and fuel is generally evenly spaced and distributed laterally across the combustion chamber.

During low and/or intermediate engine load/speed, engine operation alone may provide insufficient tumble flow pattern (low tumble ratio) for efficient mixing of air and fuel in the combustion chamber. An example airflow pattern having a low tumble ratio is shown in FIG. 5B. As shown in FIG. 5B, a tumble airflow pattern which provides insufficient mixing of air and fuel is less evenly spaced and more variable in its lateral distribution throughout the combustion chamber.

Generally, during low engine speed/load, as the rotatable valve approaches the maximum degree of rotation the tumble ratio is increased, and as the rotatable valve approaches the minimum degree of rotation the tumble ratio is decreased. Thus, the degree of rotation of the rotatable valve may be used to control the tumble ratio and tumble airflow pattern during low engine speed/load operation of a vehicle.

Returning to FIGS. 2-4, the rotatable valve 120 is provided to regulate airflow pattern, as the air travels from an upstream 220 region, between the air inlet (not shown) and the rotatable valve 120, to a downstream 230 region, between the rotatable valve 120 and the combustion chamber 108. As depicted in FIGS. 2-4, the direction of airflow is indicated by arrows. The rotatable valve may be rotated such that it partially protrudes into the airflow pathway and causes turbulence in airflow pattern, generating a high tumble ratio. Alternatively, the rotatable valve may be rotated such that it is substantially flush with the face of the intake duct and does not cause additional turbulence in airflow pattern. Thus, during higher engine load/speed conditions, the rotatable valve may be rotated to be aligned with the intake duct and the air pathway, and during lower engine load/speed the rotatable valve may be rotated to protrude into the air pathway. Therefore, using the example rotatable valve, a sufficient tumble airflow pattern may be provided to the combustion chamber, even under low engine load/speed operation of the vehicle. Further, the rotatable valve may be adjusted to intermediate protruding positions to provide a desired tumble airflow pattern during intermediate engine load/speed operation.

In the example first position 200, depicted in detail in FIG. 2, the first curved surface 206 is aligned/confluent with the wall (second face 204) of the intake duct 112 and does not project into the intake duct 112. The second curved surface 208 is disposed external of the intake duct. Thus, in this example, airflow through the intake duct is not affected by the rotatable valve, airflow is smooth over the rotatable valve, and the tumble ratio is not increased.

In the example second position, depicted in FIG. 3, the rotatable valve is further rotated counterclockwise to a degree, which is equal to the maximum degree of rotation. In this position, the curved step 302 projects into the intake duct 112 a distance A. An example of distance A is [approximately 5 mm+/−1 mm]. As in the intermediate position, the second curved surface 208 is exposed to the upstream 220 airflow, while the first curved surface 206 is exposed to the downstream 230 airflow. An intersection between the second curved surface 208 and the second face 204 has an angle with a magnitude a. An intersection between the first curved surface 206 and the second face 204 has an angle with a magnitude b. In the example of FIG. 3, the magnitude a is greater than the magnitude b. Thus, the rotatable valve 120 provides a more abrupt airflow obstruction on the downstream 230 side than the upstream 220 side of the curved step 302. In the example second position, the rotatable valve may provide a higher degree of tumble airflow and the tumble ratio may be increased to a maximum tumble ratio.

In the example intermediate position, depicted in FIG. 4, the rotatable valve is rotated counterclockwise to a degree which is less than the maximum degree of rotation, but greater than the minimum degree of rotation. In this position, the curved step 302 projects into the intake duct 112 a distance B, wherein distance B is less than distance A.

An example of distance B is [approximately 3 mm+/−1 mm. The second curved surface 208 is exposed to the upstream 220 airflow, while the first curved surface 206 is exposed to the downstream 230 airflow. An intersection between the second curved surface 208 and the second face 204 has an angle with a magnitude c. An intersection between the first curved surface 206 and the second face 204 has an angle with a magnitude d. In the example of FIG. 4, the magnitude c is less than the magnitude d.

Thus, the rotatable valve 120 provides a more abrupt airflow obstruction on the upstream 220 side than the downstream 230 side of the curved step 302. In the example intermediate position, upstream airflow has smoother pathway at the location of the first curved surface, and the velocity and direction of airflow are minimally affected. Further, downstream airflow, which has the abrupt step in its pathway at the location of the second curved surface, has an increased tumble airflow pattern. The rotatable valve may provide a moderate degree of turbulence to generate tumble airflow pattern and increase the tumble ratio.

FIG. 6 graphically depicts the relationship between tumble ratio and degree of rotation of the example rotatable valve 120 during low engine load/speed operating conditions. Line 600 represents the rotatable valve position and corresponding tumble ratio. As the degree of rotation increases from the minimum to degree of rotation to the maximum degree of rotation, the tumble ratio increases. As the degree of rotation decreases from the maximum degree of rotation to the minimum degree of rotation, the tumble ratio decreases. If the rotatable valve is rotated further than the maximum degree of rotation, then the tumble ratio again decreases.

In this way, a system and method are described that provide regulation of additional turbulence to airflow through an intake duct to a combustion chamber. A rotatable valve, having a first curved surface with a greater degree of curvature than a second curved surface is provided in the intake duct. An intersection between the first curved surface and the second curved surface forms a curved step. The rotatable valve may be rotated to a position where the curved step of the rotatable valve partially protrudes into the intake duct and airflow pathway to cause flow separation and thus higher tumble flow and higher turbulence in the airflow. The additional turbulence contributes to sufficient mixing of air and fuel by a tumble airflow pattern (with a high tumble ratio) during low or intermediate engine load/speed operation of a vehicle; however, as the step is curved, it has reduced effect on airflow direction and velocity. Well-mixed air and fuel increase combustion burn rate, improving combustion stability and knock suppression. Further, during high engine load/speed operation, the rotatable valve may be moved into another position wherein the rotatable valve is substantially flush with the wall of the intake duct. In this position, the rotatable valve does not affect the airflow pattern, and a sufficient tumble airflow pattern (with a high tumble ratio) may be provided by engine operation.

It will be appreciated that the configurations disclosed herein are exemplary in nature, and that these specific embodiments are not to be considered in a limiting sense, because numerous variations are possible. For example, the above technology can be applied to various types of vehicles, such as cars or trucks. In another example, the technology can be applied to hybrid vehicle or a combustion engine only vehicle. Further, the technology can be applied to stationary engines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine having a cylinder head intake duct with a curved wall proximate to a cylinder, comprising:
during a first condition, rotating a valve within the curved wall to protrude a first convex surface and a second convex surface of the valve, each convex relative to a rotational axis of the valve, into the intake duct; and during a second condition, rotating the valve to align with the curved wall.

2. The method of claim 1, wherein the first condition includes the engine being operated at a relatively lower load condition, and the second condition includes the engine being operated at a relatively higher load condition as compared with the lower load condition.

3. The method of claim 2, where, during a third condition, wherein the vehicle is operated under an intermediate engine load and speed condition, the rotatable valve is rotated to only partially protrude into the intake duct, the rotatable valve protruding into the intake duct to a lesser degree than in the first condition, the intermediate engine load and speed conditions intermediate relative to low engine load and speed conditions and high engine load and speed conditions.

4. The method of claim 1, wherein the first convex surface includes a first curved surface and the second convex surface includes a second curved surface, the first curved surface having a greater degree of curvature than the second curved surface.

5. The method of claim 4, wherein an intersection between the first curved surface and the second curved surface forms a step.

6. The method of claim 5, where, during the first condition, the step protrudes into the intake duct.

7. The method of claim 4, where, during the first condition, the first curved surface is exposed to upstream airflow and the second curved surface is exposed to downstream airflow.

8. The method of claim 1, where, during the first condition, the rotatable valve is rotated to a maximum degree of rotation, and, in the second condition, the rotatable valve is rotated to a minimum degree of rotation.

9. The method of claim 1, wherein the engine is a spark ignition engine.

10. An engine cylinder head coupled to a cylinder, comprising:
an intake duct having a wall; and
a rotatable valve, a cross-section of the valve having a first convex surface with respect to a rotational axis of the valve, the first convex surface having a greater curvature than a second convex surface with respect to the rotational axis of the valve, where in a first position, the second convex surface aligns with a curve in the wall, and in a second position, the first convex surface and the second convex surface protrude into the duct and form a curved step at the wall.

11. The engine cylinder head of claim 10, wherein the curve of the intake duct is proximate to the cylinder head, a cross section of the curve having a first curved face with a greater curvature than a second curved face, and the rotatable valve is positioned at the first curved face.

12. The engine cylinder head of claim 10, wherein the intake duct is coupled to an air inlet, airflow between the air inlet and the rotatable valve being upstream airflow, airflow between the rotatable valve and the cylinder being downstream airflow, and, the first convex surface exposed to upstream airflow and the second convex surface exposed to downstream airflow when the rotatable valve is in the second position.

13. The engine cylinder head of claim 12, wherein, in the second position, a first angle between the first convex surface and the wall has a first magnitude and a second angle between the second convex surface and the wall has a second magnitude, the first magnitude greater than the second magnitude.

14. The engine cylinder head of claim 10, where, in a third position, the first convex surface and the second convex surface partially protrude into the duct and form a curved step at the wall, the third position intermediate relative to the first position and the second position.

15. The engine cylinder head of claim 14, where, in the third position, a third angle between the first convex surface and the wall has a third magnitude and a fourth angle between the second convex surface and the wall has a fourth magnitude, the third magnitude greater than the fourth magnitude.

16. The engine cylinder head of claim 10, wherein the rotational axis is located between the first convex surface and the second convex surface.

17. The engine cylinder head of claim 16, wherein the rotational axis is mounted to a vehicle component exterior of the intake duct.

18. An engine cylinder head coupled to a cylinder, comprising:
a fuel injector positioned to directly inject fuel into the cylinder;
a spark plug;
an intake duct having an air flow path and a wall with a curvature, one end of the intake duct coupled to the engine cylinder head and an opposing end of the intake duct coupled to an air inlet; and
a rotatable valve positioned at the wall and rotatable around a rotational axis located entirely outside of the air flow path of the intake duct, where in a first position, a convex surface of the valve having a curve that opens toward a rotational axis of the valve aligns with the curvature of the wall, and in a second position, the valve forms a step at the curvature of the wall.

19. The engine cylinder head of claim 18, wherein the rotatable valve includes a first curved surface and a second curved surface, the first curved surface having a greater degree of curvature than the second curved surface, and the step is formed at an intersection of the first curved surface and the second curved surface.

20. The engine cylinder head of claim 19, wherein the rotational axis is disposed between the first curved surface and the second curved surface.

* * * * *